Sept. 20, 1966  J. C. ENBLOM  3,273,867
EVAPORATIVE AIR COOLER AND WASHER
Filed Sept. 18, 1963  3 Sheets-Sheet 1

INVENTOR.
JOHN C. ENBLOM
BY
Merchant, Merchant & Gould
ATTORNEYS

Sept. 20, 1966 — J. C. ENBLOM — 3,273,867
EVAPORATIVE AIR COOLER AND WASHER
Filed Sept. 18, 1963 — 3 Sheets-Sheet 2

INVENTOR.
JOHN C. ENBLOM
BY
Merchant, Merchant & Gould
ATTORNEYS

Sept. 20, 1966  J. C. ENBLOM  3,273,867
EVAPORATIVE AIR COOLER AND WASHER
Filed Sept. 18, 1963  3 Sheets-Sheet 3

INVENTOR.
JOHN C. ENBLOM
BY
Merchant, Merchant & Gould
ATTORNEYS

United States Patent Office 3,273,867
Patented Sept. 20, 1966

3,273,867
EVAPORATIVE AIR COOLER AND WASHER
John C. Enblom, Rochester, Minn., assignor to Crenlo, Inc., Rochester, Minn., a corporation of Minnesota
Filed Sept. 18, 1963, Ser. No. 309,628
3 Claims. (Cl. 261—29)

This invention relates to air conditioners and particularly to evaporative air conditioner assemblies of the type which are adapted for use in relatively small enclosed areas such as farm tractor cabs, industrial equipment cabs, truck and automotive vehicle cabs, work stations, and the like.

A highly important object of my invention is the provision of an evaporative air conditioning unit which by virtue of its design utilizes and circulates over the filter element such a large volume of water that it is self-cleaning even under such extreme dust conditions as would normally plug air conditioning units heretofore produced.

Another important object of my invention is the provision of an air conditioning unit of the type above described wherein the water coolant automatically drains back to a remote reservoir under action of gravity when the unit is not in use, whereby to make such units utilizable in areas where freezing temperatures occur at night, yet cooling is required during the day time.

Another object of my invention is the provision of a device of the class above described wherein due to maximization of the air flow, an extremely compact unit is made possible.

A still further object of my invention is the provision of a device of the class above described which, by virtue of efficiency of design, has minimal power requirements.

A still further object of my invention is the provision of a device of the class above described wherein the dust laden air is so uniformly distributed through all portions of the filter element that local clogging is eliminated.

A further object of my invention is the provision of a device of the class above described which is more efficient in its design and more universal in its application than devices of this type heretofore produced.

A further object of my invention is the provision of a device of the class above described which incorporates but a minimum of working parts and is relatively inexpensive to produce, and is trouble-proof in its operation.

The above and still further objects of my invention will become apparent from the following detailed specification, appended claims, and attached drawings.

Figure 1:
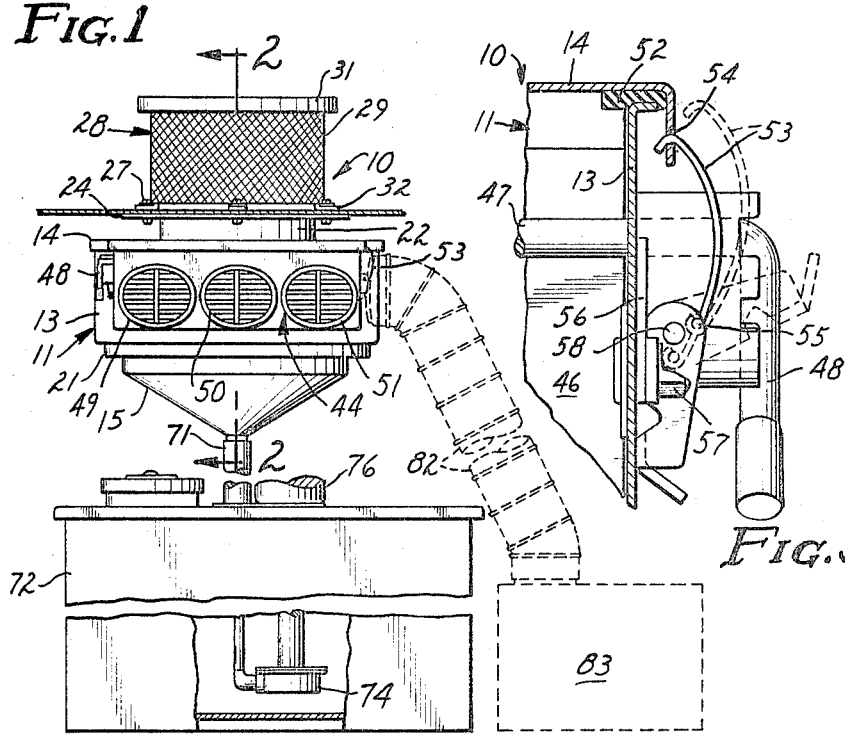
FIG. 1 is a front elevational view of an installation of an embodiment of an evaporative air conditioner assembly of the invention, the dotted line portion indicating an optional winter hookup and some parts thereof broken away.
Figure 5:
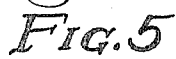
FIG. 5 is an enlarged detailed view taken along the line 5—5 of FIG. 4.
Figure 6:
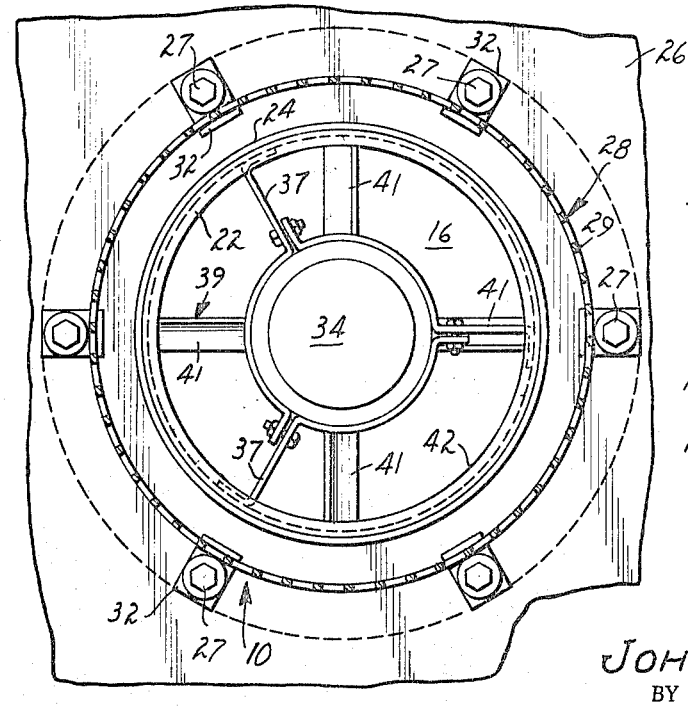
FIG. 6 is a horizontal sectional view taken along the line 6—6 of FIG. 2, some parts thereof broken away.
Figure 4:
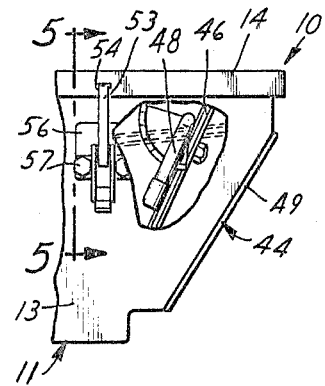
FIG. 4 is a detailed view taken in the direction of arrows 4—4 of FIG. 3, some parts thereof broken away.

Turning to the drawings, there is seen in FIG. 1 an embodiment of an air conditioner unit in the invention, herein designated in its entirety by the numeral 10. The unit 10 is seen to employ a housing, which for convenience is herein designated in its entirety by the numeral 11. The housing 11 defines a centrally located chamber region 12 which is enclosed by side wall portion 13, a top wall porion 14 and a bottom wall portion 15.

The top wall portion 14 in the unit 10 is in the physical form of a flat lid or cover having a downwardly extending lip about its perimeter, whose inside dimensions are slightly larger than the outside dimensions of said side wall portion 13 so that the top wall portion 14 mounts over the top edges of side wall portion 13. The bottom wall portion 15 is seen to be upwardly concave, as will be more fully explained below. In the embodiment shown, the side wall portion 13 and the bottom wall portion 15 are integrally formed. The housing 11 has in its top wall portion 14 a gas inlet port 16, and in its side wall portion 13, a gas outlet port 17.

A tubular filter element, herein designated in its entirety by the numeral 18, is interposed in said housing 11 between the inlet port 16 and the outlet port 17. The filter is so sized that there is an annular space 19 provided between the filter element 18 and the side wall portion 13 of housing 11. The tubular element 18 extends between the top wall 14 and the bottom wall 15. Observe that there is formed in the bottom wall portion 15 of housing 11 adjacent the side wall portion 13 a shoulder 21 which provides a sort of shelf upon which the tubular filter element 18 rests. The height of the tubular filter element 18 is so chosen that sealing engagement is provided between respective opposite end walls thereof and the top and bottom wall portions 14 and 15 in the assembled unit 10.

Upwardly extending from the gas inlet port 16 in top wall 14 is a tubular duct 22 which is telescopically received within a flange 23 formed on the perimeter of the gas inlet port 16. The duct 22 can conveniently be secured to the flange 23 by any convenient means, such as welding or the like.

Circumferentially extending about the mid-region of duct 22 is a collar 24. The collar 24 has an axially extending flange portion integrally formed therewith extending around its inside perimeter. The diameter of the flange portion on the collar 24 is such as to permit telescopic engagement over the duct 22. The collar 24 is conveniently secured to the duct 22 by any convenient means, such as welding. By means of the collar 24 the housing 11 and all attachments thereto are mounted in an actual installation. Thus, in the embodiment shown, the collar 24 is provided with a plurality of circumferentially arranged holes which permit the collar 24 to be mounted against a portion of a vehicle body, such as a roof 26, by means of nuts and bolts 27, or the like. The same nuts and bolts 27 can be used for mounting a hood assembly being herein designated in its entirety by the numeral 28. The hood assembly 28 is seen, in the embodiment shown, to consist of a cylindrical side wall portion 29 formed of expanded metal or the like, a solid or impervious roof portion 31 which is mounted over the side wall portions 29 and radially outwardly projecting mounting ears 32 which are apertured to receive the nut-equipped bolts 27, thereby permitting the hood assembly 28 to be mounted over the duct 22 in the assembled unit 10. In will be observed that in the assembled unit 10 there is provided a gasket 33 between the roof 26 and the collar 24 so as to provide a generally water-tight seal therebetween. The hood assembly 28 tends to limit the entry of macroscopic air borne particles into the duct 22.

Observe that the duct 22, the gas inlet port 16, and the tubular filter element 18 have a common axis.

An electric motor assembly 34 having a somewhat elongated drive shaft 36 is positioned in the duct 22 by means of a mounting bracket 37 so as to have the drive shaft 36 axially extend along the axis of the duct 22 and protrude a short distance into the interior region of the tubular filter element 18. The bracket 37 is adapted to circumferentially clamp the motor 34 and is secured to the inside face of duct 22 by means of welding or the like. Electricity for the motor 34 is supplied through an electrical conductor 38. On the shaft 36 is mounted a fan so positioned as to extend transversely across the port 16. The blades or fins 41 of the fan 39 are so pitched that when the shaft 36 is caused to revolve, the rotation thereof is such as to cause the fan blades 41 to draw in air through the hood assembly 28 and into the upper end or mouth 42 of duct 22 and, hence, through into the interior of the housing 11 and the chamber space formed by the top wall 14, the bottom wall 15 and the tubular filter element 18. After passing through the tubular filter element 18, the air is allowed to escape through the gas outlet port 17. After passing through the outlet port 17, the gas enters a short duct 43 which is integrally formed with the side wall 13 of the housing 11. On leaving the duct 43, the air stream is caused to return to atmosphere within the space being conditioned. The air stream passes by a damper 46 and then out through louvered grille assembly 44. The damper 46 is of conventional design and will not be described in detail herein except to observe that the damper 46 is mounted so as to pivot about a shaft 47 horizontally extending between the outturned portions of the side wall 13 forming the side walls of the duct 43. The shaft 47 is rigidly connected to the damper 46 and pivotally mounted in the walls of the duct 43 so that by turning an exterior portion 48 of the shaft 47, the damper 46 is made to pivot about the shaft 47. The louvers 49, 50, and 51 which are mounted across the mouth of the duct 43 are circular and mounted for pivotal movements about their axis, respectively, so that the air stream issuing from the duct 43 can be directed into a predetermined direction by an operator of the unit 10. Thus, air escaping from duct 43 can be controlled in direction and in volume by means of the dampers and louvers 49, 50, and 51.

In order to provide a generally air-tight seal between the top wall 14 and the rounded side wall 13, a gasket 52 is positioned between the top wall 14 and the upper end of the side wall 13. The top wall 14 is clamped to the side wall 13. Tension is applied to each hook 53 by means Thus, hooks 53 are received within eyes 54 in the top wall 14 and when said hooks are tensioned or pulled downwardly, the top wall 14 is pulled downwardly against the side wall. Tension is applied to each hook 53 by means of a toggle link 55 which is pivotally mounted on the side wall 13 by means of a bracket plate 56. Plate 56 is held to the side wall 13 by means of a nut-equipped bolt 57.

On the lowermost end of the shaft 36 is rigidly mounted a spreader pan 59. The spreader pan 59 has a circular edge wall 60 and a generally downwardly concave lower surface 61. Thus, the spreader pan 59 is adapted to rotate on shaft 36 with the fan 39.

The tubular filter element 18 is porous and conventionally constructed of a fibrous material. While the thickness and porosity of the material comprising the filter element 18 may vary, depending upon different dust, temperature, and other conditions, I have found that relatively inexpensive filtering material may be used without detracting from the efficiency of the unit because of the large quantity of water being constantly run thereover. In the embodiment shown, a fibrous material 63 forming the bulk of the filter element 18 is backed by a cylindrical screen 62.

Figure 2:
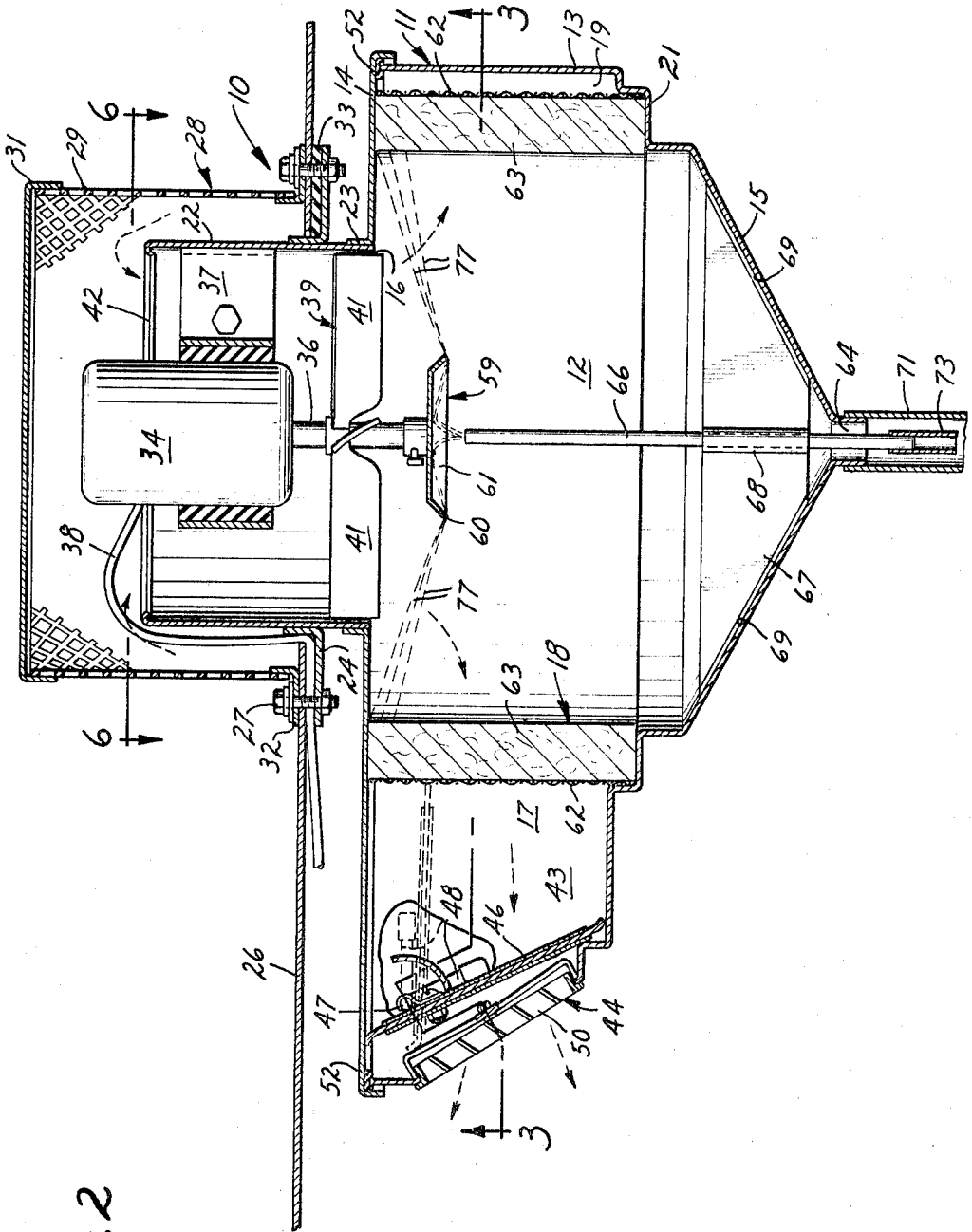
FIG. 2 is a vertical view taken along the line 2—2 of FIG. 1.
Figure 3:
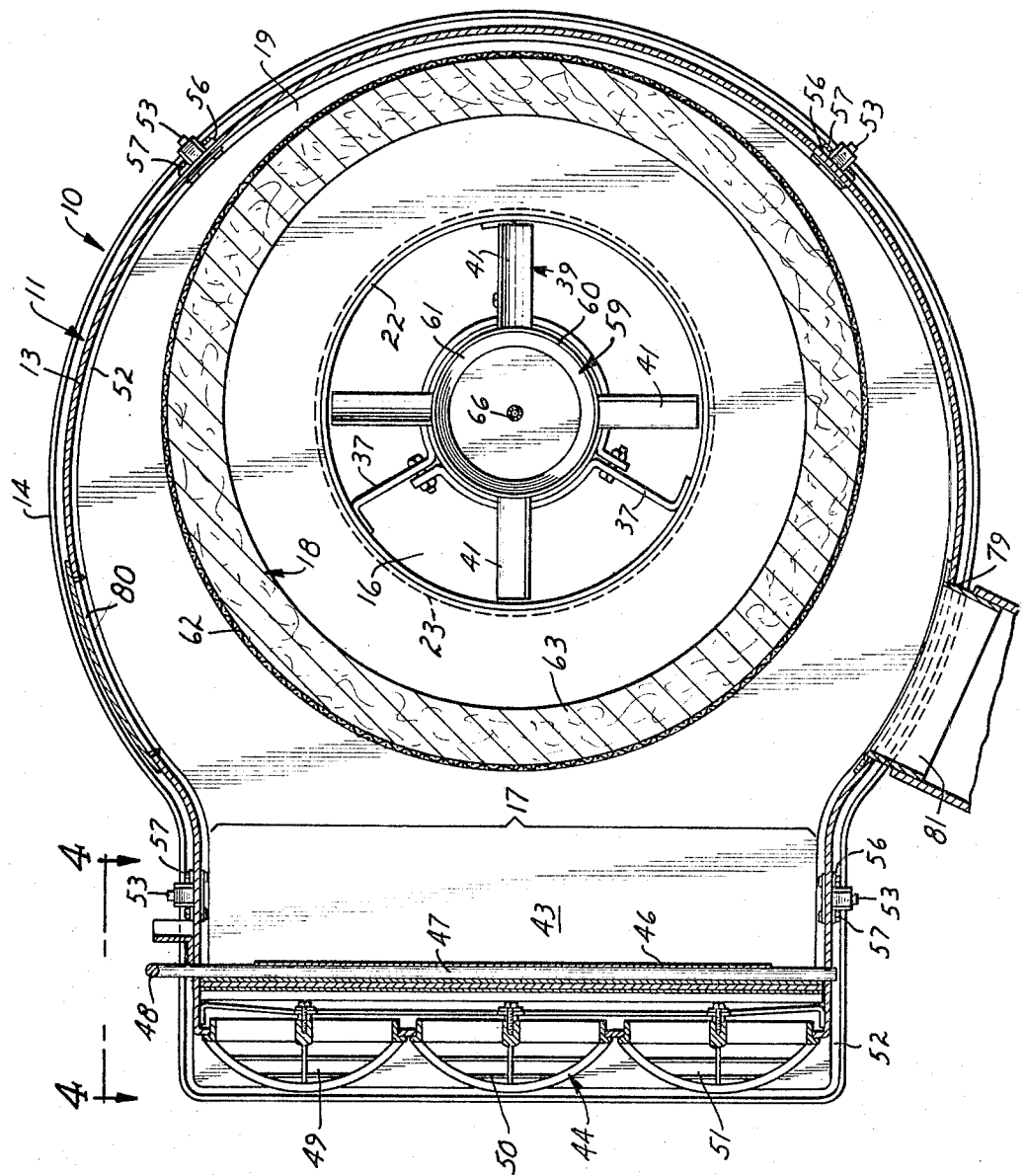
FIG. 3 is a horizontal sectional view taken along the line 3—3 of FIG 2.

The direction of air flow through the housing 11 is indicated generally by the dotted arrows, as shown in FIG. 2. As will be appreciated from an examination of FIG. 3, the tubular filter element 18 is not positioned in the center or co-axially with the housing 11. Instead, the filter element 18 and also the gas inlet port 16 are eccentrically positioned with the respect of wall 13 to assure equal flow of air through all areas of filter 18, thus avoiding localized clogging and assuring maximization of air flow through the unit 10.

It will be observed that the bottom wall portion 15, which is generally upwardly concave in the region under the filter element 18, has such concavity arranged so as to fall under the filter element 18, as shown, for example, in FIG. 2.

Referring to the conical portion 15 of the housing 11, it is seen that the portion is generally funnel shaped, with the mouth of the funnel opening into the chamber 12 and the neck of the chamber opening into a throat herein designated in its entirety by the numeral 64. Extending upwardly through the throat 64 is a rigid tube 66 whose diameter is generally smaller than that of the throat 64. The tube 66 is generally coaxial with the throat 64 and is positioned in place by means of a vortex-preventing bracket element 67. The bracket element 67 extends diametrically across the conical portion of the interior of the member 15 and has a tubular recess 68 axially extending and integrally formed therein which is adapted for receipt of the tube 66. The opposite end regions of the bracket element 67 have shoulder portions 69 formed therein which adapt the bracket element 67 for fitting against the inside faces of the conical portion of the member 15. The shoulders can be conveniently secured to the member 15 by any convenient means such as welding, riveting, or the like. Similarly, the tube 66 can be conveniently fixed in the tubular recess 68 by means of welding, riveting, or the like.

The tube 66 extends upwardly into the chamber 12 to a point spaced a short distance below the pan 59, and is coaxial with shaft 36 of motor 34.

A flexible tube 71 of rubber or the like, having a diameter approximately the same as that of throat 64, is received thereover. The other end of the tube 71 is connected to a reservoir designated in its entirety by the numeral 72. Within the tube 71 extends a flexible tube 73. The tube 73 is connected at its one end to the tube 66 and at its other end to a pump designated in its entirety by the numeral 74 within the reservoir 72. A pump 74, which can be of a centrifugal type, is powered conveniently by electric motor 76 located on top of the reservoir 72. Thus, the reservoir 72 can be remotely located with respect to the housing 11. The reservoir 72 is conveniently filled with a liquid such as water which is suitable for entraining dust or the like when the unit 10 is in operation. In normally temperate climates the coolant fluid used is water. However, during the winter months a nonaqueous, nontoxic coolant fluid such as propylene glycol can be used.

When electric power is supplied to motor 76 and to motor 74, liquid coolant from the reservoir 72 is delivered through the tube 73 into the tube 66 and forced against the lower surface of the spreader pan 59. When the water strikes the whirling or rotating undersurface 61 of the pan 59, water is spun upwardly and leaves the circular edge wall 60 of the pan 59 traveling in an upward arcuate path suggested by the dotted lines so that a stream of water is continuously directed at the upper edge portion of the filter element 18. Upon striking the filter element 18, the water is taken up by the fibrous material 63 and trickles downwardly to the bottom of the filter, at which point the same trickles downwardly into the circular mouth of the conically-shaped bottom wall portion 15 and enters the throat region 64, from which it is conducted by means of the duct 71 back to the reservoir 72, thereby completing a circle.

In an operating unit 10, air entering through the hood assembly 28 and passing through the duct 22, past the mouth inlet 16 and into the central chamber 12, passes through the filter element 18 and out of the outlet 17 by way of the duct 43. Air is caused to circulate by the fan 39, the blades of which draw in air past the hood assembly 28 and into the central chamber 12. As the air passes by the stream of water or coolant fluid 77 in the central chamber 12, some filtering of the air is achieved, but when the air enters the filter element 18 and flows therethrough, the fibrous material 63 of filter element 18 in combination with the coolant fluid dripping downwardly through the filter element 18 removes or filters out a very high percentage of solid particles in the air stream.

The reservoir 72 as shown is remotely positioned below the level of the unit 10 as to assure automatic drainage thereof under the action of gravity.

In order to permit the unit 10 to be used during the winter months, it is sometimes convenient to provide in the housing 11 an aperture 79. Conveniently, the unit 10 is also built with a corresponding aperture on the opposite side of the housing 11. In the embodiment shown, however, the aperture 79 is fitted with a flue 81 which is conveniently attached to the housing 11 by any suitable means. To flue 81 is conveniently attached a flexible conduit or an air duct of conventional construction such as that suggested by the dotted lines in FIG. 1 and designated herein in its entirety by the numeral 82. This duct feeds filtered air from the unit 10 to a heater 83, also of conventional design. After passing through the heater 83, the air stream is conveniently discharged into the space being conditioned.

My invention has been thoroughly tested and found to be completely satisfactory for the accomplishment of the above objects; and while I have shown and described a preferred embodiment, I wish it to be specifically understood that the same is capable of modification without departure from the spirit and scope of the appended claims.

What I claim is:

1. An air conditioner assembly comprising:
   (a) a housing having a peripheral side wall portion, a top wall portion and a bottom wall portion,
   (b) said housing further defining a gas inlet port in said top wall portion and a gas outlet port in said side wall portion,
   (c) said bottom wall portion defining a drain opening,
   (d) a generally tubular filter element having a vertical axis and mounted in said housing between said inlet and outlet ports and in spaced relation to said side wall portion with the opposite ends of said filter element disposed in sealing engagement with said top and bottom wall portions respectively,
   (e) a vertical drive shaft journalled for rotation substantially on the axis of said filter element and having its lower end disposed intermediate the ends of said filter element,
   (f) a generally horizontally disposed spreader pan having a generally circular outer edge and a concave undersurface and rigidly secured at its center to the lower end of said drive shaft for common rotation therewith,
   (g) power head means for rotating said drive shaft,
   (h) a reservoir for liquid coolant remote from said housing,
   (i) means including a pump and a conduit extending upwardly through said drain opening for delivering a stream of liquid coolant from said reservoir and axially against said spreader pan under surface, whereby liquid coolant striking said concave spreader pan surface is driven centrifugally outwardly against said filter element responsive to rotation of said drive shaft and spreader pan, and
   (j) a drain tube extending from said drain opening to said reservoir, said conduit extending longitudinally within said drain tube from said reservoir into said housing,
   (k) and means for imparting movement to air from said inlet port through said filter element and outwardly through said outlet port.

2. The air conditioner assembly defined in claim 1 in which said pump is disposed in said reservoir.

3. The air conditioner assembly defined in claim 1 in which said drain tube is flexible, said conduit comprising a flexible conduit section within said drain tube and a rigid conduit section within said housing and connected to said flexible conduit section adjacent said drain opening.

References Cited by the Examiner

UNITED STATES PATENTS

| | | |
|---|---|---|
| 2,262,384 | 11/1941 | Cooper. |
| 2,583,252 | 1/1952 | Carraway _____ 261—29 X |
| 2,587,130 | 9/1952 | Feinberg _____ 261—28 |
| 2,681,609 | 6/1954 | Drager _____ 261—98 X |
| 2,752,134 | 6/1956 | Paulus _____ 261—29 |
| 2,771,283 | 11/1956 | Eranosian _____ 261—91 X |
| 3,147,319 | 9/1964 | Goettl _____ 261—29 |
| 3,193,261 | 7/1965 | Nesbitt _____ 261—29 X |

FOREIGN PATENTS 904,606  8/1962  Great Britain.

HARRY B. THORNTON, *Primary Examiner.*

T. R. MILES, *Assistant Examiner.*